United States Patent [19]
Klar

[11] 3,903,420
[45] Sept. 2, 1975

[54] LONG-LIFE NEUTRON DETECTOR FOR INSTRUMENTATION OF A NUCLEAR REACTOR CORE

[75] Inventor: Erich Klar, Erlangen, Germany

[73] Assignee: Siemens Aktiengesellschaft, Munich, Germany

[22] Filed: Nov. 15, 1972

[21] Appl. No.: 306,940

[30] Foreign Application Priority Data
Nov. 22, 1971 Germany............................ 2157741

[52] U.S. Cl. ............................................... 250/390
[51] Int. Cl. ............................................... G01t 3/00
[58] Field of Search..................... 250/390; 313/610

[56] References Cited
UNITED STATES PATENTS
3,390,270   6/1968   Treinen et al. ..................... 250/390

Primary Examiner—James W. Lawrence
Assistant Examiner—Davis L. Willis
Attorney, Agent, or Firm—Kenyon & Kenyon Reilly Carr & Chapin

[57] ABSTRACT

The invention concerns a neutron detector adapted for use in the core instrumentation of nuclear reactors. It comprises an emitter electrode which, upon irradiation with neutrons, emits electrons by means of $(n,\gamma)$ processes, a collector electrode, and a dielectric disposed between the emitter and the collector electrode. Thulium 169 or terbium 159 is used as the emitter substance. With this emitter substance a prompt signal is obtained, the magnitude of which hardly changes for years; any delayed signals that may build up and any interference currents due to them are so small that they can be compensated for by simple, known means.

1 Claim, 1 Drawing Figure

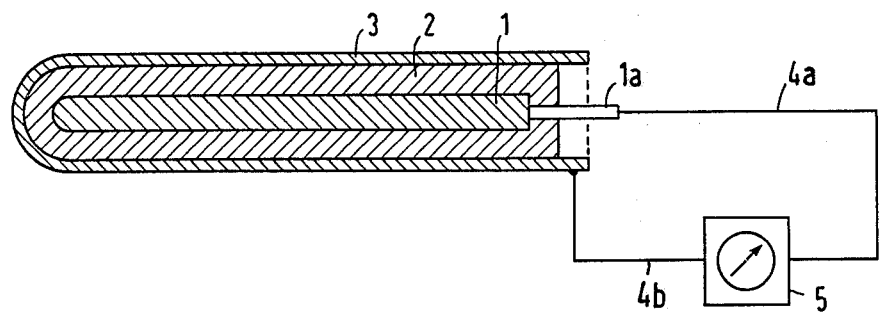

LONG-LIFE NEUTRON DETECTOR FOR INSTRUMENTATION OF A NUCLEAR REACTOR CORE

This invention relates to a neutron detector adapted to measure the amount of neutrons being produced in an environment. It particularly relates to an instrument for determining the neutron flux in a nuclear reactor.

In operating a nuclear reactor, it is necessary to be able to measure the neutron flux produced by the reactor. The instrumentation advantageously produces a signal which is of large magnitude and promptly responds to changes in neutron flux, and which does not appreciably change in magnitude (for any given amount of neutron flux) over long periods of service time, e.g., a few years.

It has now been discovered that the employment in a neutron detector of the type herein described of thulium 169 or terbium 159 as an electron emitter source results in the production of a signal which (for a given amount of neutron flux) changes only slightly over a service life of a few years, and which is large in magnitude and promptly responsive to changes in the amount of neutron flux.

The neutron detector comprises an emitter electrode, a collector electrode, and a dielectric insulator. The dielectric insulator is located between the emitter electrode and the collector electrode. The emitter electrode comprises an emitter material which, when exposed to irradiation (excitation) by and capture of neutrons, emits electrons by means of $(n,\gamma)$ processes and produces at least two secondary products. The last-to-be-produced of such secondary products is a stable isotope having a neutron-capture cross section substantially less than, the neutron-capture cross section of the emitter material. The emitter material preferably comprises thulium 169 or terbium 159.

The apparatus may also include a circuit electrically connecting the emitter electrode and the conductor electrode, wherein the circuit includes means (e.g., an ammeter) adapted for measuring the amount of current flowing through the circuit.

Thus the invention furnishes an improvement in neutron detector apparatus which is adapted to measure the neutron flux of a nuclear reactor. The improvement comprises employing as the emitter material in the emitter electrode a substance which, when exposed to irradiation by neutrons, emits electrons and produces at least two secondary products. The last-to-be-produced of such secondary products is a stable isotope having a neutron-capture cross section substantially less than the neutron-capture cross section of the emitter material.

In a neutron detector employing an emitter material in accordance with the invention, the emitter electrode, upon neutron irradiation, produces a chain of stable or unstable secondary and growth products, which in turn have a considerable neutron-capture cross section. The chain of secondary products is broken when a stable isotope having a negligible neutron cross section is produced. Rapid burnout of the emitter electrode is thereby avoided, because the secondary products, which themselves can be activated by neutrons, create a growth effect, and the emitter electrode renews itself continuously. The promptly responsive signal, indicative of the magnitude of the neutron flux, then changes only inappreciably even over extended periods of time.

Investigation of thulium 169 as the emitter material has shown that, compared with $Co^{59}$ as the emitter material, a useful signal greater by a factor of 3 is obtained, and thereby a more favorable neutron-$\gamma$ratio. Small, easily compensated interference currents occur with thulium 169 only during the first 2 years of operation. After 5 years of operation, a decrease of only 20% of the promptly responsive signal is observed with thulium 169. After a service interruption of 2 months, a decrease of only 2% of the prompt signal is observed, because of the delayed signal.

The invention is described hereinafter with reference to the drawing, which illustrates a longitudinal cross section of a neutron detector.

An emitter electrode 1 is surrounded by a dielectric insulator 2 and a collector electrode 3. The collector electrode 3 may be made, for instance, of nickel or steel. The dielectric insulator 2 may be a ceramic material, e.g., aluminum oxide or magnesium oxide. The emitter electrode 1 contains thulium 169 or terbium 159 as the emitter material. Either may be employed even under difficult operating conditions of a nuclear reactor.

An electrical circuit comprises a lead 1a from the emitter electrode 1 out through the dielectric insulator 2. Electrically conductive wires 4a, 4b are connected, respectively, to lead 1a and collector electrode 3. An ammeter 5 is located in the circuit.

Upon irradiation with neutrons, the emitter electrode 1 emits without time delay electrons of such energy that they can penetrate and pass through the dielectric insulator 2 and strike the collector electrode 3. The voltage potential difference produced thereby generates a current in the circuit comprising wires 4a, 4b and ammeter 5. The current is proportional to the number of the electrons striking the collector electrode 3 and is therefore a measure of the neutron flux to which the neutron detector is exposed. As the electrons are emitted without delay, a promptly responsive signal is obtained which accurately indicates the neutron flux. Interference currents, which are caused by unstable isotopes generated as secondary products, may occur at the beginning of operation. For the reasons already mentioned, these interference currents can be compensated for by simple known means, as described, for instance, in the article by E. Schruefer, "Die Kernflussinstrumentierung grosser Leistungsreaktoren" (Nuclear Flux Instrumentation of Large Power Reactors), Atom und Strom, No. 5/6, p. 84, (May/June, 1969).

Having thus described the invention, what is claimed is:

1. A neutron detector comprising an emitter electrode, a collector electrode and dielectric insulation between said electrodes; wherein the improvement comprises said emitter electrode comprising an emitter containing a material selected from the class consisting of thulium 169 and terbium 159.

\* \* \* \* \*